Patented Mar. 6, 1928.

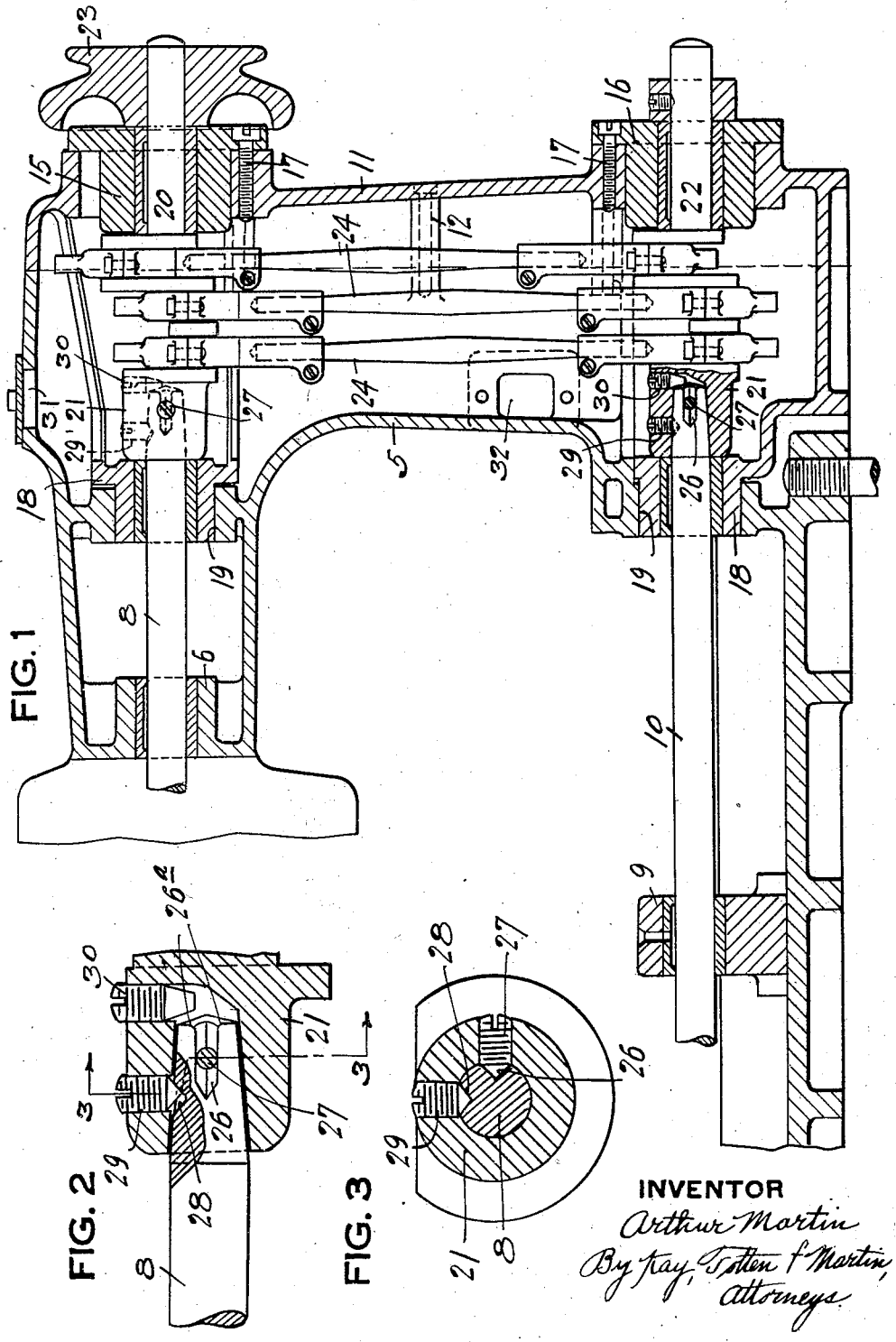

1,661,226

UNITED STATES PATENT OFFICE.

ARTHUR MARTIN, OF PITTSBURGH, PENNSYLVANIA.

SHAFT COUPLING.

Original application filed August 27, 1924, Serial No. 734,464. Divided and this application filed February 20, 1925. Serial No. 10,595.

My invention relates to shaft couplings and particularly to means for assembling said shafts in predetermined definite relation to one another.

My invention has for its object the provision of an improved form of shaft coupling whereby a plurality of adjustably connected shafts may be assembled in definite circumferential relation.

Another object of my invention is to provide a joint of tapered form between two shafts and means for effecting tight contact between the co-operating engaging surfaces thereof.

Still another object of my invention is to provide improved means for conveniently removing a tapered member from a complementally formed seat without danger of injuring the parts.

For convenience I have shown my invention as employed in connection with a detachable unit drive for sewing machines, but it will be understood that it may be used in connection with various types of mechanisms.

One form which my invention may take is shown in the accompanying drawing wherein Fig. 1 is a sectional view in side elevation of a drive unit embodying my invention and a portion of a sewing machine to which said unit is applied; Fig. 2 is an enlarged detail view, partially in section, of my improved form of coupling shown in Fig. 1, and Fig. 3 is a view taken on the line 3—3 of Fig. 2.

This application constitutes a division of my copending application, Serial No. 734,464, filed August 27, 1924.

The apparatus is shown as applied to a sewing machine casing 5 that contains a bearing 6 having a needle bar operating shaft 8 (only a portion of which is shown), and a bearing 9 for a transmission shaft 10. The sewing machine mechanism, which is not shown, may be of conventional form.

I provide an auxiliary casing or housing 11 which is open at its left hand side and is detachably secured to the casing 5 by screws 12 (only one of which is shown) that have threaded engagement with the casing 5. The housing 11 is provided with openings for the reception of bearing blocks 15 and 16 that are secured in place by screws 17 which have threaded engagement with the casing 11. The casing 11 is also provided with two forwardly extending outward bearing portions 18 that are adapted to seat within accurately bored openings 19 formed in the casing 5. Two three-throw crank shafts 20 and 22 are supported in bearings 15 and 16 and are provided on their inner ends with tapered coupling sockets 21 for the reception of the inner tapered ends of the shafts 8 and 10.

The shaft 20 is driven by a band wheel pulley 23 and drives the shaft 22 through the medium of three connecting rods 24 that are joined at their respective ends to the shaft 20 and 22 by means of the usual straps joined to such shafts.

By unscrewing the screws 12 it will be seen that the housing 11 and the crank shafts and other mechanism carried thereby can be removed from the casting or main housing 5, to permit access to the mechanism for inspection and repairs. In assembling the parts, the auxiliary casing 11 is brought to the position shown in Fig. 1 and securely fastened in place by the screw 12. It then becomes necessary to connect the crank shafts 20 and 22 securely to the main shafts 8 and 10, respectively. The shafts 8 and 10 must have proper relative circumferential adjustment so that the mechanisms not shown to which their outer ends are connected will operate in properly timed relation.

For the purpose of effecting this circumferential adjustment, I provide each of the shafts 8 and 10 with a longitudinal V-shaped slot 26 having a radius on the edges as shown at 26ª into which the tapered inner ends of screw 27 that are carried by the coupling sockets 21 may be driven, thereby insuring that the shafts will occupy a definite predetermined circumferential relation. The shafts 8 and 10 are also each provided with a tapered recess or spot hole 28 for the reception of a set screw 29. The axes of each recess 28 and its associated screw 29 are normally offset longitudinally of the shaft so that as the screw is driven home, the shaft 8, for example, will be drawn snugly to its seat within the socket 21.

The sockets 21 are also each provided with a screw 30 that is slightly tapered at its inner end so that it may have an extended tapered surface engagement with the inner end of the shaft 8, the end of which is chamfered to the same taper as the screw 30. The screw 30 is provided for the purpose of starting the shaft 8 from its seat when it is desired to disconnect the detachable drive unit from the main frame 5. The extended surface just referred to avoids distortion of either the metal of the screw or the end of the shaft under the pressure often required to start the shaft from its seat within the socket 21.

Openings 31 and 32 are provided in the walls of the housing, of sufficient size to permit entry of a screw driver for the purpose of operating the screws 27, 29 and 30 when assembling and disassembling the parts. Thus the only assembling operations required to be made from the exterior of the casing are those which necessitate the loosening of the screws referred to.

By the arrangement just described the detachable drive unit may be applied to shafts of any size, providing such shafts have ends tapered to fit within the sockets 21. Therefore in order to enable a single drive unit to be interchangeably employed with various machines of different sizes, it is necessary only to standardize on the shaft and size of the tapered shafts to seat the ends of the shafts of said mechanism.

It will be apparent that the shafts 8 and 10 may be provided with the sockets and the inner ends of the crank shafts 20 and 22 tapered to fit said sockets, and that various other changes may be made without departing from the spirit and scope of the invention as defined in the accompanying claims.

I claim as my invention:

1. Driving mechanism comprising a driving shaft, a driven shaft, one of said shafts having a tapered end and the other being provided with a tapered socket, a set screw carried by the socket and having a tapered point, the tapered shaft end having a recess adapted to be engaged by said tapered screw point, the said recess and screw being normally slightly offset longitudinally of the shaft so that when the screw is driven down the tapered shaft end will be drawn tightly to its seat within the socket, and a second tapered screw carried by said socket in position to be brought into engagement with the end of said tapered shaft when drawn to its seat by the first-named screw and start it from its seat.

2. Driving mechanism comprising a driving shaft, a driven shaft, one of said shafts having a tapered end and the other being provided with a tapered socket, the tapered shaft having a recess, and tapered set screws carried by said socket one of which is in position to engage said recess to force the tapered shaft into the tapered socket and the other of which is in position to start the shaft from said socket.

In testimony whereof I the said ARTHUR MARTIN have hereunto set my hand.

ARTHUR MARTIN.